US005206071A

United States Patent [19]

[11] Patent Number: 5,206,071

[45] Date of Patent: Apr. 27, 1993

Atherton et al.

[54] ARCHIVABLE INK JET RECORDING MEDIA

[75] Inventors: David Atherton, North Kingstown, R.I.; Kang Sun, North Attleboro, Mass.; Sen Yang, Warwick, R.I.

[73] Assignee: Arkwright Incorporated, Fiskeville, R.I.

[21] Appl. No.: 798,923

[22] Filed: Nov. 27, 1991

[51] Int. Cl.$^5$ .............................................. B32B 9/00

[52] U.S. Cl. .................................... 428/195; 428/201; 428/204; 428/206; 428/331; 428/913

[58] Field of Search ............... 428/195, 212, 201, 204, 428/331, 206, 913, 914

[56] References Cited

U.S. PATENT DOCUMENTS

| | | | |
|---|---|---|---|
| 4,300,820 | 11/1981 | Shah | 351/160 |
| 4,379,804 | 4/1983 | Eisele et al. | 428/332 |
| 4,547,405 | 10/1985 | Bedell et al. | 427/256 |
| 4,554,181 | 11/1985 | Cousin et al. | 427/261 |
| 4,578,285 | 3/1985 | Viola | 429/209 |
| 4,785,313 | 11/1988 | Higuma et al. | 346/138 |
| 4,857,386 | 8/1989 | Butters et al. | 428/206 |
| 4,935,307 | 6/1990 | Iqbal et al. | 428/500 |
| 4,944,988 | 7/1990 | Yasuda et al. | 428/195 |

FOREIGN PATENT DOCUMENTS 6441589 2/1989 Japan .

OTHER PUBLICATIONS

Kudela, V., Encyclopedia of Polymer Science and Engineering, pp. 783–807, vol. 7, (1987).

Kulicke et al., Polymers in Aqueous Media, pp. 15–44 (1989).

*Primary Examiner*—Patrick J. Ryan

*Assistant Examiner*—W. Krynski

*Attorney, Agent, or Firm*—Birch, Stewart, Kolasch & Birch

[57] ABSTRACT

Film mediums useful in ink jet printing which films comprises a transparent, translucent or opaque substrate, having on at least one side thereof a water-insoluble, water-absorptive and ink-receptive matrix, said matrix comprised of a hydrogel complex and a polymeric high molecular weight quaternary ammonium salt.

34 Claims, 1 Drawing Sheet

ARCHIVABLE INK JET RECORDING MEDIA

FIELD OF THE INVENTION

This invention provides novel ink jet recording media which possess enhanced archivability and quality and which are suitable for presentation graphics, design engineering and office systems applications.

BACKGROUND OF THE INVENTION

In recent years, printers using sprayable inks, such as the ink jet printer, have come into general use. These printers, which employ ink jet heads having small orifices that propel inks in a continuous stream of drops or in minute individual drops on demand, are used in various electronic printing applications. They offer not only high speed but quiet operation without the need for external developing or fixation procedures. Further, through the use of multiple ink jet heads, various colors may be obtained suitable for computer graphics applications; for example, the printing or plotting of bar charts, graphs, pie charts and the like benefit from color differentiation.

Because of the simplicity and economy of ink jet film printing, this imaging process holds promise for growth beyond transparency making. Wide-format electronic printing of engineering and architectural designs is a natural expansion of ink jet printing. Office systems applications which include publications and promotional materials is another. These applications go beyond the normal clear or transparent films and require film supports and coating composites that are tailored to new end uses.

Ink jet systems employed in informational electronic printing are comprised of three components: the printer, the ink and the receptor sheet. The printer controls the size, number and placement of the ink droplets and contains the transport system. The ink provides the colorants which form the image, and the receptor sheet provides the medium which accepts and holds the ink. The quality and archivability of ink jet prints is a function of the total system. However, the composition and interaction of the ink and the receptor material most affect the quality and archivability of the imaged product.

Ink compositions which are useful in ink jet recording systems are well known and generally contain water, organic solvents and dyes. There is thus disclosed, for example, in European Patent 0,294,155, an ink jet composition useful in ink jet recording consisting of water based vehicle containing about 30–99% wt. water with the balance made up of high boiling solvents such as glycol, glycol ethers, pyrrolidones and amides. The inks contain preferably acid or direct dyes.

In present practice, ink jet systems fall broadly into two categories; those that employ high organic solvent-water based inks, and those that are essentially aqueous. Aqueous inks normally contain up to 10% of a high boiling solvent such as diethylene glycol, whereas high organic solvent inks contain, in addition to water, about 50% of a high boiling organic solvent such as diethylene glycol. The imagery of both of these types of ink has poor water resistance (i.e., the dye image leaches out or the image layer containing the dye dissolves). Additionally, the dye image is prone to smudging.

While earlier ink jet printing applications employed paper, presentation films such as overhead projection transparencies soon found favor because of the simplicity and economy of their preparation. However the design requirements of film and film-like surfaces differ from those of paper and are much more difficult to meet. Despite improvements in ink jet film compositions, there remain problems which inhibit the realization of the full potential of ink jet printing.

Ink jet film compositions are normally sensitive to water and their imagery can dissolve and leach out. Also, under humid conditions, their imagery can bleed thereby losing definition, all the more when the inks employ high boiling solvents such as the glycols. Conventional ink jet prints often lack light resistance and good file aging properties. All the above shortcomings require resolution to achieve good print archivability.

Polymeric films for use as recording media represent a special problem in ink jet recording because their surfaces are hydrophobic or quasi-hydrophobic. Even when their surfaces are treated with special coatings to accept and absorb the inks, it is difficult to obtain the requisite qualities of image density and resolution without incurring tack, smear, image bleed, water solubilization of the ink receptive matrix, or other undesirable properties.

The use of water/glycol ink systems presents a special problem. At high humidities, a phenomenon described as image bleed, occurs. The ink jet printer applies small ink droplets in a selective pattern to form the images. These droplets are absorbed into the coating on the film surface to form dots. After initial absorption, the dye continues to spread laterally. Some post imaging spread is desirable to fill in the white areas between the dots and obtain good image density. At high humidities, however, this spreading continues and causes the image to spread excessively, that is, to bleed thereby losing image sharpness or resolution. Ink vehicles which do not contain high boiling solvents such as glycol do not exhibit this level of image bleed.

There is considerable literature which describes attempts to provide the optimal receptor sheet. Approaches to the problem of hydrophobic surfaces include use of polymers alone or in admixture as ink receptive coatings; see for example, U.S. Pat. Nos. 4,503,111; 3,889,270; 84,564,560; 4,555,437 and 4,578,285. Multiple coatings have also been employed in trying to overcome the various problems associated with hydrophobic nature of recording media; illustrative of these coatings are U.S. Pat. No. 4,379,804, Japanese Patent Number 01041589 and Japanese Disclosure Numbers 86-132377; 86-074879 and 86-41549. Additionally, the use of mordants to help fix the dye and minimize bleed has been the subject of a number of patents, including U.S. Pat. Nos. 4,554,181; 4,578,285 and 4,547,405.

SUMMARY OF INVENTION

This invention pertains to the role the receptor medium plays in minimizing the above described shortcomings and in achieving a superior quality ink jet media of good archivability for a variety of applications. An object of this invention is to help provide an ink jet recording medium whose ink receptive matrix and image are essentially water insoluble, non-bleeding under high humidity conditions, and fade resistant. These qualities confer archivability to the ink jet prints. Another objective of this invention is to provide an ink jet drafting medium suitable for design engineering use. A further object of this invention is to provide an opaque ink jet film suitable for graphic and office systems applications. All of the above objectives, as well as others, are achieved with the present inventive films. More specifically, the present invention provides ink jet receptor media such as the following:

(a) a film composite, which comprises a transparent, translucent or opaque substrate, having on at least one side thereof an essentially clear water-insoluble, water-absorptive and ink receptive matrix layer, such matrix layer comprising a hydrogel complex and a polymeric high molecular weight quaternary ammonium salt which is not readily extractable from the matrix layer;

(b) a matte film composite, which comprises a transparent, translucent or opaque substrate, having on at least one side thereof a water-insoluble, water-absorptive and ink receptive matrix layer, such matrix layer comprising a hydrogel complex, a high molecular weight quaternary ammonium salt which is not readily extractable from the matrix layer, a pigment having a MOH hardness of from about 2.2 to 7.0 and a Critical Integrity Value of at least 20 g;

(c) a film composite as recited in (a) or (b) optionally having a coating on the opposite side of the ink receptive matrix layer (i.e., a backcoat) which minimizes curl and/or assists in minimizing ink offset and/or blocking and in providing transport reliability; and (d) a film composite as recited in (a), (b) or (c), optionally having a topcoat on the ink receptive side thereof, that is more absorptive than the matrix underlayer.

The invention is also concerned with a method of producing ink jet prints and with ink jet printing systems utilizing aqueous and aqueous-solvent based inks, which employ the above described ink jet receptor media, among others. Furthermore, the invention addresses the requirements for improved ink jet films and like media and their broader application to new products.

BRIEF DESCRIPTION OF THE DRAWINGS

The present invention will become more fully understood from the detailed description given here and below and the accompanying drawings which are given by way of illustration only, and thus, are not limitative of the present invention, and wherein.

DETAILED DESCRIPTION OF THE INVENTION

Figure 1:
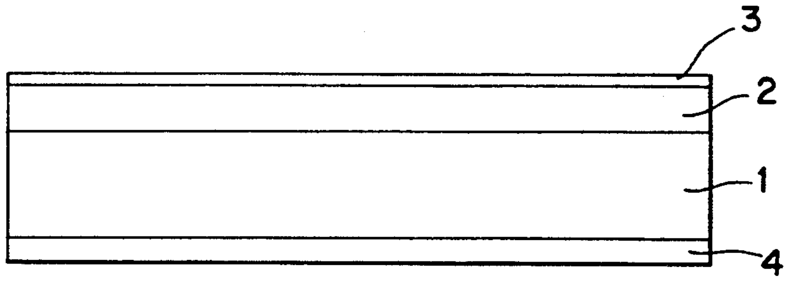
FIG. 1 is an illustration of a film composite of the present invention, wherein (1) is a base support, (2) is an ink receptor matrix layer, (3) is an optional topcoat layer, and (4) is an optional backcoat layer.

The following description and the Examples are provided herein to aid those skilled in the art in practicing the present invention. Even so, the present inventive discovery is not to be unduly limited by the disclosures made herein, since those of ordinary skill in the art may prepare equivalent ink jet receptor media and/or ink receptor coatings which do not depart from the spirit or scope of the present inventive discovery.

The film composites encompassed by the present invention possess a base support having thereon an essentially clear water-insoluble, water-absorptive and ink-receptive matrix layer, which comprises a hydrogel complex and a polymeric high molecular weight quaternary ammonium salt. The matte film composites disclosed herein comprise an ink receptor matrix layer comprising a hydrogel complex, a polymeric high molecular weight quaternary ammonium salt, a pigment possessing a MOH hardness of from about 2.2 to 7.0 and a Critical Integrity Value (as defined herein) of at least 20 grams. Each of the above components of the present inventive media are discussed in detail below.

The base supports for the ink receptor matrix layers may be selected from any suitable film such as polyethylene terephthalate, cellulose acetate, polysulfone, polystyrene, polycarbonate, polyolefin or other polymeric film base supports. These film supports may be transparent, translucent or opaque but must be transparent if used for overhead image projection. The base supports generally possess a thickness of from about 25 to 175 microns. In order to make the film support more receptive to the ink receptor matrix layer formulation to be applied thereto, its surface may be pretreated with an adhesion promoting substance, or be coated with an intermediate subbing layer as generally known in the art. Alternatively, a paper base support may be employed which has a discrete film layer over its surface applied by coating or lamination, at least on the ink receptive side. Such paper/film combinations may possess a thickness greater than those recited above.

Hydrogels encompassed by this invention include those formed through the complexing of a poly(N-vinyl heterocyclic) moiety, preferably which contains a ketonic function on the heterocyclic ring, and a water-insoluble complexing agent such as a water-insoluble comb-graft copolymer, among others. Additionally, copolymers using the said poly(N-vinyl heterocyclic) moiety may be employed to form hydrogels encompassed hereby.

Typical poly(N-vinyl heterocyclics) which can form the hydrogels encompassed hereby are poly(N-vinyl pyrrolidone), poly(N-vinyl-4-methyl-2-oxazolidone) and the like.

The water-insoluble polymeric complexing agents most suitable for hydrogel formation with poly (N-vinyl heterocyclic) moieties are water-insoluble polymers such as comb graft copolymers having a hydrophobic backbone and polymeric hydrophilic side chains. These comb graft copolymers are very effective in forming such hydrogels. Even so, the water-insoluble quaternary ammonium salts disclosed herein can also act as suitable complexing agents in forming hydrogels with poly (N-vinyl heterocyclic) moieties, if so desired.

Suitable complexing comb-graft copolymers for forming hydrogels encompassed hereby possess hydrophobic backbone chains comprising substituted and/or unsubstituted forms of polyesters, polyurethanes, polyacrylic and polymethacrylic esters, vinyl polymers (such as polyvinyl chloride and polyvinyl acetate), diene polymers (such as polybutadiene), polyolefins (such as polyethylene and polypropylene), cellulose and its derivatives (such as cellulose esters and mixed esters), polystyrene, and copolymers of the foregoing. Polymers and copolymers particularly suitable for forming the hydrophilic side chains of the comb-graft copolymers include one or more substituted or unsubstituted poly(hydroxyalkyl acrylates and methacrylates), poly(acrylic and methacrylic acid), poly(N-vinyl pyrrolidone), poly(hydroxyalkylmethacrylate/N-alkylolacrylamide), poly(vinyl alcohol), poly(acrylamide) and quaternary ammonium moieties. Preferred embodiments of complexing comb-graft copolymers include those wherein poly(methylmethacrylate) is the hydrophobic backbone and hydroxylethylmethacrylates are the hydrophilic side chains or poly(methylmethacrylate) is the hydrophobic backbone and poly(N-vinyl pyrrolidone) is the hydrophilic side chains.

The weight ratio between the polymeric backbone chain and the hydrophilic side chains in the complexing comb-graft copolymers of the present invention may vary within a wide range from 10 to 90 up to 90 to 10, so long as the copolymer remains essentially water-insoluble. The use of complexing comb-graft copolymers in which the weight ratio of the hydrophobic backbone to the hydrophilic side chains is between about 50 to 50 and 90 to 10, is preferred. In any case, it is important that the ratio of the hydrophilic side chains to the hydrophobic backbone not exceed that ratio which would confer water-solubility to the comb-graft copolymer.

The graft copolymers used according to the invention can be prepared by techniques well known in the art. A survey of manufacturing techniques for such graft copolymers can be found in the book series "Block and Graft Copolymerization" edited by R. J. Ceresa and published by John Wiley & Sons, New York, 1976.

Generally the components of the hydrogel can be used alone or in combination with such additives as wetting, antistatic, antisettling dispersing agents and the like. The exact structures of the hydrogel complexes of this invention are not known. However, it is believed that in the instance of a hydrogel complex of a comb-graft copolymer and a poly(N-vinyl heterocyclic) moiety, the hydrophilic segments of comb-graft copolymers and the hydrophilic heterocyclic moiety of the N-vinyl heterocyclic form the complex. But whatever their structure may be, the hydrogel complexes encompassed hereby confer upon the ink receptor matrix layers a high affinity for both water-based and high glycol inks, while remaining water-insoluble. Thus such ink receptor matrix layers help provide high image density and brightness and lack of smear and offset to the present inventive mediums.

It has been unexpectedly found that relatively small amounts of comb-graft copolymers (in the range of 5 to 35% of the weight of the hydrogel) are sufficient to produce highly absorptive water insoluble hydrogel complexes with poly (N-vinyl heterocyclic) moieties. By contrast, simple block or random copolymers of hydrophobic and hydrophilic units without relatively long functionalized side chains generally require a much higher proportion of such copolymers to form equivalently water-insoluble compositions with the same poly(N-vinyl heterocyclic) moieties. Moreover, the complexes formed with these block or random copolymers do not have the high water absorptivity of the poly(N-vinyl heterocyclic) comb-graft copolymer complexes disclosed herein. As a possible explanation, it may be that such random or block copolymers do not form hydrogels with poly(N-vinyl heterocyclic) moieties and thus do not provide a composition possessing high water absorptivity.

The inventors have found rather surprising that the choice of the solvent vehicle used in the coating formulation plays an important role in the formation of the hydrogel complex in the ink receptive layer. For example, important to this invention is the use of organic solvent systems, as distinguished from predominantly aqueous systems, to provide a suitable medium for hydrogel formation. However, not all organic solvents are useful in providing hydrogels. Thus, to ensure proper hydrogel formation in the ink receptive matrix layer, the components of the hydrogel must be soluble in the solvent or solvents employed. For example, the use of certain glycol ethers has proved useful in forming hydrogels in conjunction with poly (N-vinyl heterocyclic) moieties and comb-graft polymers, such as described herein. Particularly, methylated ethers such as propylene glycol monomethyl ether form superior water resistant hydrogel complexes. It is not understood why certain solvents conversely have an adverse effect on hydrogel formation; however, adverse effects may result from competition by the more hydrophilic solvents for the hydrogel complexing sites.

According to one of the most preferred embodiments of the invention, the ink receptor matrix layer comprises a mixture of about 65 to about 90% by weight of a poly(N-vinyl heterocyclic), most preferably poly(N-vinyl pyrrolidone), and about 35 to 10% by weight of a comb-graft copolymer. The graft copolymer preferably comprises 15 to 40% by weight of hydrophilic side chains (preferably consisting of poly(hydroxyalkylacrylate or hydroxyalkylmethacrylate) or poly(N-vinyl pyrrolidone)) and 85 to 60% by weight of a hydrophobic backbone (preferably consisting of poly(methylmethacrylate)). Such ink receptor matrix layers are highly ink absorbent and yet water-insoluble.

In order to achieve archivability of ink jet prints, it is necessary to immobilize the dye image in the ink receptor matrix. This conventionally can be accomplished by the use of a mordanting agent. Since the inks generally utilized in ink jet printing employ anionic dyes, it is possible to fix the image by the use of a cationic compound such as polymeric quaternary ammonium salts or compounds utilizing phosphonium moieties. Quaternary ammonium salts (Quats) are usually the preferred means of dye fixation. However, typical quats do not usually provide adequate low tack, fade resistance, water-insolubility or bleed resistance at high humidities. Hence, such quats do not work adequately in the present inventive ink jet receptor media with inks normally utilized.

To work suitably, the quaternary ammonium salts (quats) of this invention must be: (1) of high molecular weight, (2) soluble in a selected organic solvent vehicle, and (3) compatible with the hydrogels described herein, and (4) resistant to extraction by water from the hydrogel matrix. The average molecular weights of the quats preferably fall in the range of from about 10,000 to 500,000 and most preferably from 25,000 to 250,000. They may be water-soluble but are preferably water-insoluble. Hydrogel compatibility of the chosen quats is ascertained by casting a film of about 6.0 $g/m^2$ containing both the selected hydrogel and the chosen quat(s). A clear film on drying signifies compatibility. The water extractability of the quats is determined by immersion of the coated samples in water and measuring the amount of the quats which is extracted from the coating. The procedure utilized to measure extractability is more fully described hereafter.

Exemplary of the quaternary ammonium salts which are useful in the present invention are those encompassed by the following Formula I.

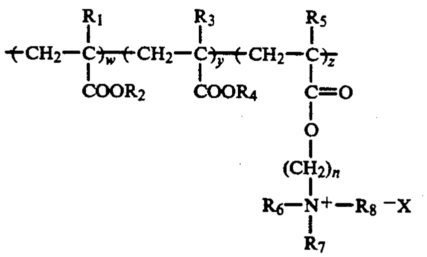

wherein:

$R_1$, $R_3$ and $R_5$ are hydrogen, or are straight or branched chain lower alkyl having from 1 to 8 carbons;

$R_2$, $R_4$ and $R_6$–$R_8$ are straight or branched chain lower alkyl having from 1 to 8 carbon atoms;

X− is a univalent, bivalent or tertiary anion including $Cl^-$, $I^-$, $F^-$, $ClO_4^-$, $SO_4^{-2}$, $PO_4^{-3}$, among others;

n is 2 to 8; and w, y and z are positive integers of at least 1.

Preferably, in Formula I, $R_1$–$R_8$ are as follows:

$R_1$, $R_3$ and $R_5$ are H, $—CH_3$, or $—C_2H_5$;

$R_2$ and $R_4$ are $—CH_3$, $—CH_2CH_3$ or $—C(CH_3)_3$, or $—C_2H_5OH$; and $R_6$, $R_7$ and $R_8$ are $—CH_3$ or $—CH_3CH_2$.

The above quaternary ammonium salts should generally possess an average molecular weight in the range of about 10,000 to 500,000, and preferably from about 25,000 to 250,000. The quaternary functional groups thereof normally comprise from 15% to 40% of the total number of monomers in the polymer, alternatively expressed as follows:

$$0.15 \leq \frac{z}{w + y + z} \leq 0.4,$$

wherein w, y and z are as defined above. The quats of the above structure provide much improved light fade resistance of imagery in the present inventive ink jet media.

Selecting a quat falling within the above Formula I is one way of choosing a suitable quat for use in the present inventive films. Another useful method is based on the Water Extractability Index (WEI) of the quats, which method measures the extractability of a selected quaternary ammonium salt from a selected hydrogel matrix using the method herein disclosed.

The Water Extractability Index of a quat encompassed appears to be a function of a number of factors including (1) the molecular weight of the quat, (2) the kind and number of hydrophilic and/or hydrophobic groups on a molecule of the quat, and (3) the stereo chemistry of the quat as well as (4) the molecular composition and structure of the hydrogel in which the quat is employed. Generally, quats become more water extractable when they possess the qualities of low molecular weight, numerous water-solubilizing groups, and little or no molecular bonding with the hydrogel utilized in the matrix. Conversely, a chosen quat is less water extractable when the foregoing qualities are missing (or minimized) in the chosen quat.

The above-described factors can also be used to determine the effectiveness with which dyes are immobilized or fixed in the ink receptive matrix layers of the present inventive films, since the lower the water extractability of the quat utilized, the more effectively the dyes are fixed. Similarly, the better the dye fixation, the more water-resistant, bleed-resistance and dye fade resistant is a produced image.

The present inventors have discovered that when a quat in a hydrogel coating possesses a Water Extractability Index of less than about 40 and preferably less than about 25, as determined by the test method disclosed in the Examples section hereof, it exhibits greatly improved properties.

The preferred quat structures are water insoluble and of high molecular weight and have a low WEI, generally below about 25. These quats are particularly suitable for use in media with high glycol inks, because the images produced do not create serious tack problems. Typical copolymeric quats having a low WEI are those comprised of two moieties, of which one monomer is water soluble and the other is not. The molar ratio of the water-soluble (WS) to water-insoluble (WI) moiety determines the Water Extractability Index. The following Table 1 illustrates this relationship:

TABLE 1

| Ratio WS/WI | WEI | Water-Solubility |
|---|---|---|
| 15 | <8.5 | Insoluble |
| 20 | <8.5 | Insoluble |
| 25 | 13.3 | Insoluble |
| 30 | 25.4 | Partially Soluble |
| 45 | 36.1 | Soluble |

The data in the above Table are for the special case where the water-insoluble moiety is methyl-methacrylate and the water-soluble moiety is quaternized dimethylaminoethyl methacrylate with methylchloride. Another example of a water-insoluble quat is a quaternized copolymer of methylmethacrylate, n-butylacrylate and dimethylaminoethyl methacrylate in the proportion of 55/20/25 by weight of each moiety and having an average molecular weight of about 75,000.

Acceptable WEI values can be obtained with both water-insoluble and water-soluble high molecular weight quaternary ammonium salts. The imagining system and ink composition will determine the WEI of choice for the quat of the ink receptive matrix.

Because of the special character of the hydrogels of this invention, certain high molecular weight water-soluble quaternary ammonium salts may also be used in the present inventive media to improve the water and bleed resistance thereof, if so desired. Such water-soluble quats may generally comprise a copolymer of two moieties, both of which are water soluble and one of which contains a quaternary ammonium moiety. Specific examples of such water-soluble quats are quaternized copolymers of vinylpyrrolidone and dimethylaminoethyl methacrylate and copolymers of vinylimidazolium methochloride and vinyl-pyrrolidone. Generally, the quaternary moiety confers the greater solubility on the copolymer, and the ratio of the more soluble to the less soluble moiety is selected to produce the desired properties. Terpolymers may also be employed to provide suitable quaternary ammonium salts by appropriate choice and ratio of the moieties. In any case, suitable water-soluble quats are selected on the basis of the water extractability thereof, and the water-soluble quats encompassed hereby possess a Water Extractability Index of less than about 40 and preferably less than about 25 as determined by the test method disclosed herein.

Typical commercially available water-soluble quats have low molecular weights and impart properties to the ink receptive medium which are inferior to those imparted by the high molecular weight water-soluble quats. This is especially true in respect to water and bleed resistance. As a result of this fact, such low molecular weight water-soluble quats will normally fail to meet the Water Extractability Index requirement set forth herein.

While certain water-soluble quats can be used in the present inventive media and provide the media with water and bleed resistance, it should also be realized that such quats possess a drawback in that they usually also induce tack if used with ink jet printing systems employing high glycol based inks.

The quaternary ammonium salts of this invention which meet the Water Extractability Index requirements set forth herein provide, in addition to water and bleed resistance, improved light-fade resistance of the imagery in the present inventive ink jet media. It has been discovered that these unexpected advantages are exhibited when the dye-fixing quats, such as those described above, are present in the ink receptor matrix layers in an amount of from about 5 to 50% w/w and preferably in an amount of 5 to 25% w/w.

In addition to the use of the above quaternary ammonium salts, it is also possible to further immobilize the dye images in the present mediums by means of metal salts such as those of calcium, zinc, aluminum, chromium, cobalt, among other multivalient metallic salts if so desired.

Ink jet printing may be used for design engineering and technically allied applications where ink and/or pencil annotatability are usually required. The pigments used in the annotatable matte films of this invention are selected to achieve a unique set of properties. Foremost among these is the need for rapid drying of the ink to avoid offset and smear in the stacking tray during the printing process. The pigments are also selected to help provide good image density through their effect on lateral ink dot diffusion. The pigments chosen also must be sufficiently abrasive or hard to ensure good density of pencil annotations. Also, pigments may be employed containing multivalent cations to help provide dye mordanting properties. In applications that require ultraviolet transmissive copying, such as in diazo copying processes, the pigment chosen must not unduly absorb ultraviolet and visible light. Furthermore, the matrix containing the pigment must neither absorb nor excessively scatter light in those regions.

The hydrogels of this invention provide good ink drying properties but they are insufficient to provide adequately rapid drying for the intended applications. Drying is considerably enhanced through the use of a pigment and a pigment concentration which provides a high void volume. However, an excessively high void volume will cause the matrix to lose its cohesiveness or physical integrity. As such, the pigment and pigment concentration are selected so that the matrix layer does not have a Critical Integrity Value less than 20 g. The Critical Integrity Value can be found by producing coatings of increasing pigment to binder ratios until the coatings become too weak for their intended uses, i.e., they no longer possess adequate cohesiveness. For the purpose of this invention, the Critical Integrity Value (loss of cohesiveness) can be determined by using a GARDNER Balanced Beam Scrape-Adhesion and Mar Tester, according to ASTM 2197 test method employing a Hoffman tool. The minimum weight which will produce a first penetration through the ink-receptive matrix layer by the Hoffman tool is designated as the Critical Integrity Value (The test procedure is described below). The Critical Integrity Value of the matrix layer is at least about 20 g when determined in accordance with the test method provided herein.

It has been found that the higher the mass ratio of pigment to hydrogel in the matrix layer, the higher the void volume, the faster the drying rate and the higher the image density. Conversely, the lower said mass ratio, the greater the cohesive strength of the layer and the resolution of the image, but the slower the rate of drying and the lower the image density. In practice, the best balance of properties is found close to, but not less than, the Critical Integrity Value of 20 grams. It has been found that the pigment to hydrogel mass ratio that is required to equal or exceed the Critical Integrity Value will vary with the pigment and binder. Thus, a suitable selection of these materials is undertaken prior to determining the optimal mass ratio of pigment to hydrogel. The optimal mass ratio of a pigment to hydrogel is determined by assessing the important performance qualities desired and selecting those which give the best balance of properties.

A suitable balance of properties is achieved when the mass ratio of pigment to hydrogel is about 0.2:1 to 3.5:1, but more suitably the mass ratio is about 0.5:1 to 2:1, and the average particle size is about 0.5 to 10 microns and preferably about 2.0 to 6.0 microns. Pencil annotatability is achieved by selecting a pigment with a MOH hardness of from about 2.2 to 7.0, preferably from about 4.0 to 7.0. Where ultraviolet transmissiveness is required, the pigment selected has a refractive index of from about 1.4 to 1.7. Ink annotatability of conventional pen inks is achieved by virtue of the inventive hydrogels employed herein. Additionally, the pigment to hydrogel ratio is selected within the specified range to adjust the dot spread to best suit the ink and ink applying system.

There are preferred pigments which are employed with the hydrogel of this invention which provide the requisite annotatability, rapid drying, image density and actinic transmissiveness. These include amorphous and crystalline silica, aluminum trihydrate, calcium carbonate, potassium sodium aluminum silicate, diatomaceous earth, silicates of aluminum and magnesium and mixtures thereof. However, not all pigments are generally suitable as the major pigment constituent in the ink-receptive matrix. These include polyolefin particulates and like organic materials, talc, zinc oxides, lithophone, and titanium dioxide, among others.

At times it may be desirable to increase the visual contrast of the imaged matte films. This may be accomplished by the addition of a very small quantity of a white, opaque pigment such as titanium dioxide or barium sulfate/zinc sulfide. Typical concentrations of these pigments are from about 1 to 10% by weight to the total pigment weight and preferably about 1.0 to 3.0% by weight.

In all, the pigment and the pigment to hydrogel mass ratio in the ink receptive matrix must conform to the requirements described above.

In transmissive copying, the pigment selected must have a refractive index of from 1.40 to 1.70 and preferably at or close to the refractive index of the hydrogel utilized. For reflective copying, it may not be necessary to have an actinically transmissive matte film. Consequently, an opaque base support may be utilized and/or the pigments in the matrix may be of a higher refractive index than specified for transmissive films.

The clear film and matte composites of this invention may utilize a topcoat, if so desired to help control the diffusion rate of the ink between lateral spread and penetration. The ideal diffusion balance is where the ink dots spread just enough to fill in the white areas between the dots so as to achieve high image density. Excessive ink dot spread will cause loss of image resolution. Alternatively, such a topcoat may be used to produce desired surface properties such as pencil tooth and/or pencil erasure and receptivity of pen inks. Preferably, the topcoat is more absorptive than the matrix layer.

In practice, the surface properties of the ink jet matrix layer may be modified to alter the matrix layer's characteristics in the following ways. For example, a water-soluble topcoat or overcoat may comprise hydrophilic polymers such as polyvinyl alcohol, hydroxymethyl cellulose, hydroxyethyl cellulose, hydroxypropylmethyl cellulose and carboxymethyl cellulose, either alone or in combination or in admixture with a poly (N-vinyl heterocyclic) moiety such as described herein (e.g., poly(N-vinyl pyrrolidone)). The topcoat layer may also contain a comb-graft copolymer of the type used in the ink receptor matrix layers disclosed herein, preferably having a hydrophilic side chain content of about 30 to about 70% by weight. For example, a surface layer containing a polymeric binder and pigment may be employed over the matrix layer to modify drafting properties and/or to provide good pencil erasure.

In practice, various additives may be employed in the coatings of both the clear and annotatable ink jet recording media, in either the ink-receptive matrix formulation or the overcoat formulation, or both. These additives include surface active agents which control wetting or spreading action of the coating mixture, antistatic agents, suspending agents, particulates which control the frictional properties or alter the reflective properties or act as spacers, and compounds with acidic groups to control the pH, among other properties, of the coated product.

Conventionally, a coating is employed on the backside, or on the side opposite to the image-receptive layer of an imaging film; the backcoat comprising a pigment and a binder. This is to help provide reliable transport through an imaging device and to balance the tension on the two sides of the film so that the print will lie flat. In the case of transparent films, the choice of pigment and the amount employed is such as to keep any possible increase in haze at a minimum. For some ink jet printers, the backcoat of the annotatable film requires an additional and important quality. It must provide "spacers" to keep the freshly imaged film that goes into the stacking tray of the printer separated from the next on-coming print, since some ink jet printers deliver prints image side down into stacking trays. Thus, if the spacing between the prints is not substantial, ink offset may result. The inventors have discovered that the offset problem can be mitigated by providing a non-ink-absorbent backcoat with a spacer pigment therein which holds the sheets apart. The pigments employed for this purpose include amorphous and crystalline silicas, starch, microcrystalline cellulose, partially sulfonated polystyrene ionomers, hollow sphere polystyrene beads and the like. The average particle size of the pigment is important and is in the range of 10 to 30 microns and preferably 15 to 20 microns. The film backcoat should have a Sheffield reading of 80–270 Sheffield units. Below 80, insufficient spacing is achieved to be effective and above 270, the coatings become unacceptably rough in appearance. However, if offset is not a problem, a lower Sheffield Value may be employed. Typical of binders used in the backcoats disclosed herein are polymers that are not water absorptive, such as the acrylates, methacrylates, polystyrenes and polyvinyl-chloride-polyvinylacetate copolymers.

For engineering applications, it is advantageous to utilize a conventional drafting surface on the non-imaging slide of the present inventive matte films. Such drafting surfaces are well known in the art. This will permit additions to be made on the back side of the film. In such circumstances, the image on the face side is reverse reading.

The coating weight of the ink receptive matrixes disclosed herein are dependent upon the type and quantity of ink applied. However, the ink receptive matrix layers are generally applied to film supports in an amount of about 2 to about 20 $g/m^2$ and preferably in an amount of about 3 to about 10 $g/m^2$. The topcoat layers referred to herein are preferably applied to the ink-receptor matrix layers in an amount of about 0.1 to about 2.0 $g/m^2$, or an amount sufficient to modify the surface characteristics of the film composite. The backcoat layers referred to herein usually possess coating weights of 2 to 12 $g/m^2$, preferably from 4 to 8 $g/m^2$. Any of a number of methods may be employed in the production coating of the individual layers in the film composite of the present invention, such as roller coating, wire-bar coating, dip-coating, air-knife coating, slide coating, curtain coating, doctor coating, flexographic coating, or gravure coating. Such techniques are well known in the art.

In most of the embodiments of the present invention described above, there generally exists a film substrate having a ink-receptor matrix layer applied thereto, and optionally a topcoat layer and/or a backcoat layer. Even so, there are also encompassed by the present invention coated film composites wherein the base support thereof comprises a polymeric film which is laminated or coated onto a paper or paper product.

Although the primary application of the ink-receptive matrixes of this invention are in ink jet printing, their properties make it useful for offset printing, pen recording, manual drafting and like image-making processes.

EXAMPLES

This invention is illustrated in more detail referring to the following examples. The chemical names listed for the individual components of the formulations are those believed to represent the manufacturers' trade name. In the Examples, "parts" are all by weight.

The following general procedure was used for the preparation of the recording medium according to the examples.

A polyethylene terephtalate film was used as either light-transmissive substrate for transparency or engineering uses, or light-reflective substrate for graphic art uses. The film was coated by means of a Meyer rod on one of its surfaces with the formulations according to each of the following examples. The coated samples are dried in a circulating hot air oven at about 250° F. for two to three minutes.

Monochromatic and color ink jet recording tests were conducted on the coated recording medium. Unless otherwise indicated in the imaging tests of the examples, the printers employed for the essentially clear coatings are the Paint Jet XL300 and the Desk Jet C, and for the matte films they are the Design Jet and Desk Jet 500.

For water resistance and light fade resistance tests, the four inks of different colors in aqueous system were used.

The test procedure employed to determine Critical Integrity Value is as follows:

Samples of non-imaged transmissive specimens are conditioned overnight under TAPPI conditions. The Critical Integrity Value is determined by taking the average of 6 results as tested on a GARDNER Balanced Beam Scrape Adhesion Tester #SG8101 and Hoffman Tool SG-1611. The procedure conforms to ASTM 2197. An even force at about 1 inch per second was used to pull the sample past the Hoffman Tool. Increments of weight were employed to determine the penetration endpoint. The endpoint, or Critical Integrity Value, is that weight which first removes the coating down to the substrate. This endpoint is determined by placing the scored samples representing the different weights on the stage of an overhead projector in a darkened room and observing which weight produces the first visible light transmission onto the screen.

The test procedure employed for determining the Water Extractability Index of a chosen quaternary ammonium salt is as follows:

The quaternary ammonium salt (quat) is added to the ink receptive matrix formulation under study to provide 0.004 moles of the quat moiety per square meter. The formulation is coated onto a 4 mil polyethylene terepthalate film support and dried at 100° C. for 3 minutes, said dried coating comprises the ink receptive film coating.

Step 1—Cut a 10×2 inch sample of the coated film into $\frac{1}{4}\times 2\frac{1}{2}$ inch pieces and place in a $\frac{3}{8}\times 5\frac{1}{2}$ inch test tube. Add 20 ml of deionized water, ensuring the sample is completely immersed. Let the sample/water stand overnight (approximately 18 hours). Decant the water extract into the sample vial provided in the CHEMetrics® Titrets kit. Titrate according to the CHEMetrics® procedure. (A CHEMetrics® kit for determining the level of the quaternary ammonium compound (quat) in aqueous solution is obtainable from CHEMETRICS INC., Calverton, Va.)

Step 2—Calculate the quantity of the quaternary ammonium salt in the sample coating ($QUAT_c$) utilizing the following equation:

$$mg\ of\ QUAT_c = gm/m^2 \times \%\ of\ quat \times 12.9^*$$

(*wherein 12.9 represents a conversion factor)

Step 3—Calculate the quantity of the quaternary ammonium salt in the water extract ($QUAT_{WE}$) utilizing the following equation:

$$mg\ of\ QUAT_{WE} = scale\ units \times MW/448.1^* \times 2$$

(*wherein 448.1 represents a conversion factor)

Step 4—Calculate the Water Extractability Index (WEI) of the quaternary ammonium salt in the coating utilizing the following equation:

$$WEI = [mg\ of\ QUAT_{WE}/mg\ of\ QUAT_c \times 100$$

In the above equations, scale units are from CHEMetrics® Titrets, and MW=molecular weight of the quat under test and the WEI is the % of quat extracted from the ink receptive film coating.

In the present inventive film media, the WEI is below about 40%, and preferably below about 25%. The WEI as defined herein may be measured conveniently as described above, however, since it is also defined herein independently of the Chemetrics method it can be evaluated using any method which determines the amount of quat in a film and the amount thereof extracted from the film using the extraction method employed.

The test procedures employed for determining water fastness or resistance in the Examples is as follows:

Print color blocks of black, cyan, magenta and yellow on the imaging side of the sample with a 300 dpi (dots per inch) resolution ink jet printer using aqueous based inks. Cut 1"×1" square of each color and immerse into deionized water for five minutes. Air dry the sample at 50° C. for 30 minutes. Measure the color parameters, L*, a*, b* of the color blocks of both the unwashed and washed samples using a Macbeth Color Eye 1500 spectrophotometer with illuminant C at a 10 degree angle. Obtain color difference, ΔE, from the following equation:

$$\Delta E = [(\Delta L^*)^2 + (\Delta a^*)^2 + (\Delta b^*)^2]^{\frac{1}{2}}$$

The test procedure employed for determining light fastness or fade resistance of the image in the Examples is as follows:

Print color blocks of black, cyan, magenta and yellow with a 300 dpi ink jet printer using aqueous based inks. Expose the printed samples to a panel of fluorescent lights (the light intensity was approximately 10,000 Lux near the sample surface). Set the exposure time at 24 hours. Measure the color parameters, L*, a*, b* of the color prints before and after light exposure. Determine the color difference, ΔE, from the following equation:

$$\Delta E = [(\Delta L^*)^2 + (\Delta a^*)^2 + (\Delta b^*)^2]^{\frac{1}{2}}$$

EXAMPLE 1

| | |
|---|---|
| Base Coat Formulation | |
| PVP (K-90)[1] | 6.8 parts |
| Comb-graft copolymer A[2] | 1.2 parts |
| Quaternary Resin A[3] | 3.2 parts |
| Starch Pigment[4] | 0.4 parts |
| Dowanol PM[5] | 120.0 parts |
| Top Coat Formulation | |
| Methocel F-50[6] | 1.5 parts |
| Methanol | 5.0 parts |
| Water | 93.5 parts |

[1]PVP (K-90) - Poly(N-vinyl pyrrolidone), average molecular weight 360,000. Product of GAF Corporation.

[2]Comb graft Polymer A - a comb form copolymer of methyl methacrylate backbone grafted with 2-hydroxyethyl methacrylate side chains. Ratio 78/22 by weight. Average molecular weight 35,000.

[3]Quaternary Resin A - Quaternized copolymer of methylmethacrylate and dimethylaminoethyl methacrylate with a ratio of 80/20 w/w. Average molecular weight 50,000.

[4]Starch Pigment - corn starch, average particle size 16 μm.

[5]Dowanol PM - Propylene glycol monomethyl ether. Product of Dow Chemical Corporation.

[6]Methocel F-50. Product of Dow Chemical Corporation.

This base mix was coated on ICI Melinex 3.8 mil, type 339, polyester film using a No. 42 Meyer rod. After drying this coating at 250° F. for 2 minutes, the top coat mix was coated using a No. 12 Meyer rod at the same conditions. The dry coat weight of the finished coating is about 7 g/m².

Media prepared according to this example gave excellent ink receptivity, fast drying and non-tacky image in the solid area. This example showed excellent image water resistance and good light fading resistance. Results of the evaluation are shown in Table 2.

EXAMPLE 2

| Formulation | |
|---|---|
| PVP (K-90) | 6.8 parts |
| Comb-graft Polymer B[1] | 1.2 parts |
| Quaternary Resin A | 3.2 parts |
| Dowanol PM | 100.0 parts |

[1]Comb-graft Polymer B - a comb form copolymer of methyl methacrylate backbone grafted with N-vinyl-pyrrolidone. Ratio 70/30 by weight. Average molecular weight 50,000.

The mix was coated on ICI Melinex, 054 clear type and 339 opaque type, 3.8 mil polyester film under same conditions as in Example 1.

The media prepared according to this example showed the printing characteristics, water resistance and image fade resistance comparable to Example 1.

EXAMPLE 3

| Formulation | |
|---|---|
| PVP (K-90) | 7.2 parts |
| Comb-Graft Copolymer C[1] | 0.8 parts |
| Quaternary Resin A | 3.2 parts |
| Dowanol PM | 100.0 parts |

[1]Copolymer C - A comb-form copolymer of methylmethacrylate grafted with hydroxyethyl methacrylate and N-methylolacrylamide. Ratio = 77/23 w/w. Average molecular weight 35,000.

The mix was coated on ICI Melinex, 054 clear type or opaque type, 3.8 mil polyester film under the same conditions as in Example 1.

The media prepared according to this example showed quality characteristics similar to Example I.

EXAMPLE 4

| | |
|---|---|
| Base Coat Formulation | |
| PVP (K-90) | 6.8 parts |
| Comb-Graft Copolymer A | 1.2 parts |
| Quaternary Resin B[1] | 6.4 parts |
| Dowanol PM | 120.0 parts |
| Top Coat Formulation | |
| Methocel F-50 | 1.5 parts |
| Methanol | 5.0 parts |
| Water | 93.5 parts |

[1]Quaternary Resin B - copolymer of vinylpyrrolidone and dimethylaminoethyl methacrylate. Ratio 80/20 w/w, average molecular weight 100,000.

The mixes were coated on ICI Melinex 054, clear type, 2.67 mil, polyester film under conditions the same as in Example 1.

The media prepared according to this example showed improved water and light fastness over that of comparative Example 1. When a high glycol ink was substituted for the aqueous ink, similar good results were obtained, but the image became very tack.

EXAMPLE 5

| | |
|---|---|
| Base Coat Formulation | |
| PVP (K-90) | 5.8 parts |
| Comb-Graft Copolymer A | 1.0 parts |
| Quaternary Resin A | 1.2 parts |
| Diatomite Mineral Filler[1] (Superfine, Superfloss grade) | 6.4 parts |
| Dowanol PM | 80.0 parts |
| Back Coat Formulation | |
| Elvacite 2046[2] | 20.0 parts |
| Starch pigment[3] | 2.3 parts |
| Methyl Ethyl Ketone | 52.0 parts |
| Toluene | 52.0 parts |

[1]Diatomite Mineral Filler - Diatomaceous earth filler, average size 4.0 μm. Product of Manville Corporation.
[2]Elvacite 2046 - A copolymer of n-butyl methacrylate and isobutyl methacrylate. Ratio = 50/50. Product of DuPont de Nemours & Co., Inc.
[3]Starch Pigment - Corn starch, average particle size 16 μm.

The base coat mix was coated on ICI Melinex 054 type, 3.8 mil polyester film using a No. 45 Meyer rod. The wet coating was dried at 250° F. for 2.5 minutes and it gave a dry coat weight of about 9 g/m$^2$.

Media prepared according to this example exhibited fast ink drying when imaged on Hewlett Packard Desk Jet 500 and Design Jet printers. Prints were of high quality and showed no offset when imaged samples are automatically stacked in the prints receiving tray.

Water resistance results on color images are also shown in Table 3.

COMPARATIVE EXAMPLE 1

| | |
|---|---|
| Base Coat Formulation | |
| PVP (K-90) | 6.8 parts |
| Comb Graft Copolymer A | 1.2 parts |
| Starch Pigment | 0.4 parts |
| Dowanol PM | 100.0 parts |
| Top Coat Formulation | |
| Methocel F-50 | 1.5 parts |
| Methanol | 5.0 parts |
| Water | 93.5 parts |

The base coat formulation mix was coated on ICI Melinex 3.8 mil, type 339, opaque polyester film using a No. 42 Meyer rod. The wet coating was dried first at 250° F. for 2 minutes, and then the top coat mix was coated using a No. 12 Meyer rod and similarly dried. The dry coat weight of the finished coating is about 7 g/m$^2$.

Media prepared according to this example gave good ink receptivity and color density without image smearing and ink coalescence. However, results using water based inks showed inferior water and light fade resistance as shown in Table 1. When high glycol inks were substituted for aqueous inks, this product also showed inferior bleed resistance when compared to Examples 1 to 4.

COMPARATIVE EXAMPLE 2

| Formulation | |
|---|---|
| PVP (K-90) | 6.8 parts |
| Comb-graft Polymer A | 1.2 parts |
| Quaternary Compound C[1] | 2.5 parts |
| Dowanol PM | 100.0 parts |

[1]Quaternary Compound C - Cyastat 609, low molecular weight quaternary compound. MW = 474. Product of American Cyanamid Corp.

The mixes were coated on ICI Melinex, 339 type, opaque, 3.8 mil polyester film under same conditions as in Example 1.

The media prepared according to this example showed very poor water resistance properties of the image.

COMPARATIVE EXAMPLE 3

| | |
|---|---|
| Base Coat Formulation | |
| PVP (K-90) | 5.8 parts |
| Comb-Graft Copolymer A | 1.0 parts |
| Diatomite Mineral Filler (Superfine, Superfloss grade) | 6.4 parts |
| Dowanol PM | 80.0 parts |
| Back Coat Formulation | |
| Elvacite 2046 | 20.0 parts |
| Starch pigment | 2.3 parts |
| Methyl Ethyl Ketone | 52.0 parts |
| Toluene | 52.0 parts |

The mixes were coated on ICI Melinex 054, clear type, 3.8 mil polyester film under the same conditions as in Example 5. Samples prepared according to this example showed poor water resistance of the image, unlike Example 5. (See Table 3).

TABLE 2

| Sample | Black | Cyan | Magenta | Yellow |
|---|---|---|---|---|
| | Water fastness Δ E | | | |
| Example 1 | 0.7 | 1.0 | 5.8 | 0.9 |
| Comparative Example 1 | 35.5 | 53.3 | 24.5 | 85.7 |
| | Light fastness Δ E | | | |
| Example 1 | 0.3 | 7.4 | 14.8 | 1.6 |
| Comparative Example 1 | 0.4 | 21.0 | 10.3 | 6.0 |

The tabulated results provided in Table 2 indicate that the incorporation of water-insoluble quaternary resin, quaternary Resin A, into the hydrogen matrix improved the water and light resistance of the dye image.

TABLE 3

| | Water fastness Δ E | | | |
|---|---|---|---|---|
| Sample | Black | Cyan | Magenta | Yellow |
| Example 5 | 4.2 | 1.2 | 2.3 | 4.2 |
| Comparative Example 3 | 19.3 | 51.1 | 22.1 | 36.0 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. Each of the publications and patents referred herein above are expressly incorporated herein by reference in their entirety.

What is claimed is:

1. A film composite, which comprises a transparent, translucent or opaque substrate, having on at least one side thereof, an essentially clear water-insoluble, water-absorptive and ink-receptive matrix layer, the matrix layer comprising a hydrogel complex and a polymeric high molecular weight quaternary ammonium salt.

2. The film composite of claim 1, wherein the hydrogel complex comprises a poly(N-vinyl heterocyclic) moiety and a water-insoluble complexing agent, and the quaternary ammonium salt possesses an average molecular weight of from about 10,000 to 500,000.

3. A film composite as recited in claim 2, wherein the poly(N-vinyl heterocyclic) moiety is selected from the group consisting of poly(N-vinyl pyrrolidone) and poly(N-vinyl-4-methyl-2-oxazolidone).

4. The film composite of claim 2, wherein the complexing agent is a water-insoluble comb-graft copolymer having a hydrophobic backbone and hydrophilic side chains.

5. The film composite as recited in claim 4 wherein the water-insoluble comb-graft copolymer possesses a hydrophobic backbone comprising methylmethacrylate and possesses hydrophilic side chains comprising polyvinylpyrrolidone, hydroxyethyl methacrylate or hydroxyethyl methacrylate/N-methylolacrylamide.

6. A film composite as recited in claim 4, wherein the comb-graft copolymer possesses a ratio of polymeric backbone chain to hydrophilic side chains of from 10:90 up to 90:10.

7. A film composite as recited in claim 1, wherein the polymeric high molecular weight quaternary ammonium salt in the ink receptive matrix layer possesses an average molecular weight of from about 10,000 to 500,000 and possesses a Water Extractability Index of less than about 40.

8. A film composite as recited in claim 1, wherein the high molecular weight quaternary ammonium salt is a quaternary ammonium salt of Formula I:

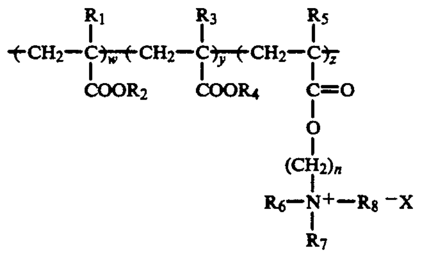

wherein:

$R_1$, $R_3$ and $R_5$ are hydrogen, or are straight or branched chain lower alkyl having from 1 to 8 carbon atoms;

$R_2$, $R_4$ and $R_6$ to $R_8$ are straight or branched chain lower alkyl having from 1 to 8 carbon atoms;

$H^-$ is $Cl^-$, $I^-$, $F^-$, $ClO_4^-$, $SO_4^{-2}$ or $PO_4^{-3}$;

n is 2 to 8; and w, y and z are positive integers of at least one.

9. A film composite as recited in claim 7 or 8, wherein the hydrogel complex comprises poly(N-vinyl pyrrolidone) and a water-insoluble comb-graft copolymer.

10. A film composite as recited in claim 1, wherein said substrate is transparent or translucent.

11. A film composite as recited in claim 1, wherein said substrate is opaque.

12. A matte film composite which comprises a transparent, translucent or opaque substrate, having on at least one side thereof, a water-insoluble, water-absorptive and ink receptive matrix layer, the matrix layer comprising a hydrogel complex, a polymeric high molecular weight quaternary ammonium salt, a pigment having a MOH hardness of from about 2.2 to 7.0 and a Critical Integrity Value of at least 20 g.

13. A matte film composite as recited in claim 12, wherein the hydrogel comprises a poly(N-vinyl heterocyclic) moiety and a water-insoluble complexing agent, and the quaternary ammonium salt possesses an average molecular weight of from about 10,000 to 500,000.

14. A matte film composite as recited in claim 13, wherein the poly(N-vinyl heterocyclic) moiety is selected from the group consisting of poly(N-vinyl pyrrolidone) and poly(N-vinyl-4-methyl-2-oxazolidone).

15. A matte film composite as recited in claim 13, wherein the complexing agent is a water-insoluble comb-graft copolymer having a hydrophobic backbone and hydrophilic side chains.

16. A matte film composite as recited in claim 15, wherein the comb-graft copolymer possesses a hydrophobic backbone comprising methylmethacrylate and possesses hydrophilic side chains comprising polyvinylpyrrolidone, hydroxyethyl methacrylate or hydroxyethyl methacrylate/N-methylolacrylamide.

17. A matte film composite as recited in claim 15, wherein the comb-graft copolymer possesses a ratio of the polymeric backbone chain to the hydrophilic side chains of from 10:90 to 90:10.

18. A matte film composite as recited in claim 12, wherein the polymeric high molecular weight quaternary ammonium salt in the ink receptive matrix layer possesses an average molecular weight of from about 10,000 to 500,000 and possesses a Water Extractability Index of less than about 40.

19. A matte film composite as recited in claim 12, wherein the polymeric high molecular weight quaternary ammonium salt is a quaternary ammonium salt of Formula I:

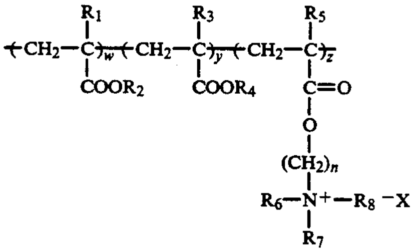

wherein:

$R_1$, $R_3$ and $R_5$ are hydrogen, or are straight or branched chain lower alkyl having from 1 to 8 carbon atoms;

$R_2$, $R_4$ and $R_6$ to $R_8$ are straight or branched chain lower alkyl having from 1 to 8 carbon atoms;

$X^{-1}$ is $Cl^-$, $I^-$, $F^-$, $ClO_4^-$, $SO_4^{-2}$ or $PO_4^{-3}$;

n is 2 to 8; and w, y and z are positive integers of at least one.

20. A matte film composite as recited in claim 18 or 19, wherein the hydrogel complex comprises poly(N-vinyl pyrrolidone) and a water-insoluble comb-graft copolymer.

21. A matte film composite as recited in claim 12, wherein said substrate is transparent or translucent.

22. A matte film composite as recited in claim 12, wherein said substrate is opaque.

23. A matte film composite as recited in claim 12, wherein the pigment is present in the matrix layer in an amount of from about 1 to 10% by weight.

24. A matte film composite as recited in claim 12 or 23, wherein the pigment is selected from the group consisting of:

crystalline silica, aluminum trihydrate, calcium carbonate, potassium sodium aluminum silicate, diatomaceous earth, aluminum silicate, magnesium silicate, and mixtures thereof.

25. A film composite as recited in claim 1 or 12, wherein the film composite further comprises a backcoat on the opposite side of the ink receptive matrix layer.

26. A film composite as recited in claim 1 or 12, further comprising a topcoat on the ink receptive matrix layer thereof, the topcoat being more absorptive than the matrix layer thereunder.

27. In an ink jet printing system, the improvement comprising:

providing a film composite, which comprises a transparent, translucent or opaque substrate, having on at least one side thereof, an essentially clear water-insoluble, water-absorptive and ink receptive matrix layer, the matrix layer comprising a hydrogel complex and a polymeric high molecular weight quaternary ammonium salt.

28. An ink jet printing system as recited in claim 27, wherein the polymeric high molecular weight quaternary ammonium salt in the ink receptive matrix layer possesses an average molecular weight of from about 10,000 to 500,000 and possesses a Water Extractability Index of less than about 40.

29. In an ink jet printing system, the improvement comprising:

providing a matte film composite which comprises a transparent, translucent or opaque substrate, having on at least one side thereof, a water-insoluble, water-absorptive and ink receptive matrix layer, the matrix layer comprising a hydrogel complex, a polymeric high molecular weight quaternary ammonium salt, a pigment having a MOH hardness of from about 2.2 to 7.0 and a Critical Integrity Value of at least 20 g.

30. An ink jet printing system as recited in claim 29, wherein the polymeric high molecular weight quaternary ammonium salt in the ink receptive matrix layer possesses an average molecular weight of from about 10,000 to 500,000 and possesses a Water Extractability Index of less than about 40.

31. In a method of preparing an ink jet print, the improvement comprising:

providing a film composite, which comprises a transparent, translucent or opaque substrate, having on at least one side thereof, an essentially clear water-insoluble, water-absorptive and ink receptive matrix layer, the matrix layer comprising a hydrogel complex and a polymeric high molecular weight quaternary ammonium salt.

32. A method of preparing an ink jet print as recited in claim 31, wherein the polymeric high molecular weight quaternary ammonium salt in the ink receptive matrix layer possesses an average molecular weight of from about 10,000 to 500,000 and possesses a Water Extractability Index of less than about 40.

33. In a method of preparing an ink jet print, the improvement comprising:

providing a matte film composite which comprises a transparent, translucent or opaque substrate, having on at least one side thereof, a water-insoluble, water-absorptive and ink receptive matrix layer, the matrix layer comprising a hydrogel complex, a polymeric high molecular weight quaternary ammonium salt, a pigment having a MOH hardness of from about 2.2 to 7.0 and a Critical Integrity Value of at least 20 g.

34. A method of preparing an ink jet print as recited in claim 33, wherein the polymeric high molecular weight quaternary ammonium salt in the ink receptive matrix layer possesses an average molecular weight of from about 10,000 to 500,000 and possesses a Water Extractability Index of less than about 40.

* * * * *